United States Patent [19]

Sergent et al.

[11] Patent Number: 4,637,865
[45] Date of Patent: Jan. 20, 1987

[54] PROCESS FOR METAL RECOVERY AND COMPOSITIONS USEFUL THEREIN

[75] Inventors: Rodney H. Sergent, West Lafayette, Ind.; Kenneth N. Thanstrom, Sylmar, Calif.

[73] Assignee: Great Lakes Chemical Corporation, West Lafayette, Ind.

[21] Appl. No.: 766,833

[22] Filed: Aug. 16, 1985

[51] Int. Cl.$^4$ ............................................... C25C 1/20
[52] U.S. Cl. ................................ 204/111; 204/105 R; 204/109; 204/110; 204/114; 204/117; 204/118
[58] Field of Search ........................... 423/24; 75/109; 204/109, 110, 111, 105 R, 114, 117, 118; 210/660, 684, 663, 669, 694, 661, 666

[56] References Cited

U.S. PATENT DOCUMENTS 3,412,021 11/1968 Paterson ................................. 210/62
4,372,830 2/1983 Law ........................................ 423/24
4,543,169 9/1985 D'Agostino et al. .................. 423/24

FOREIGN PATENT DOCUMENTS

P60202 7/1983 Australia .

OTHER PUBLICATIONS

Pressure Oxidation Pretreatment of Refractory Gold, R. M. G. S. Berezowsky and D. R. Weir, Minerals and Metallurgical Processing, 1–4, May, 1984.
The Lingering Lure of Gold Spurs Processing Developments, Gerald Parkinson, Newsfront, 19-21-23-25, Jun. 10, 1985.
Oxidation of Cyanides in Industrial Wastewaters by Ozone, W. M. Bremen, Environmental Progress, 46–51, Feb. 1985, Chapter X, Precipitation, Hamilton, Precipitation, 173-201.
Inorganic Chemistry of Gold, A. R. Raper, 41-57.
Innovative Technology for Improved Processing of Gold Ores, Ramon S. Pizarro, Mining Engineering, 1533-1536, Nov. 1984.
Gold with Pyrrhotite, McQuiston et al., 13-14; Carlin Gold Mining Company, McQuiston et al., 21-25 with attachment.
Cortez Gold Mines, McQuiston et al., 39-42, with attachment; published 1975, by Society of Mining Engineers, Sold & Silver Cyanidation Plant Practice.

*Primary Examiner*—R. L. Andrews
*Attorney, Agent, or Firm*—Senniger, Powers, Leavitt and Roedel

[57] ABSTRACT

A process for extracting a precious metal or base metal from a source material containing the metal. The process comprises contacting the source material with an aqueous leaching solution containing a leaching agent comprising an N-halohydantoin compound, thereby producing an aqueous leachate containing said metal. Aqueous leaching compositions, and novel electrowinning and other electrodeposition processes are also disclosed.

50 Claims, 1 Drawing Figure

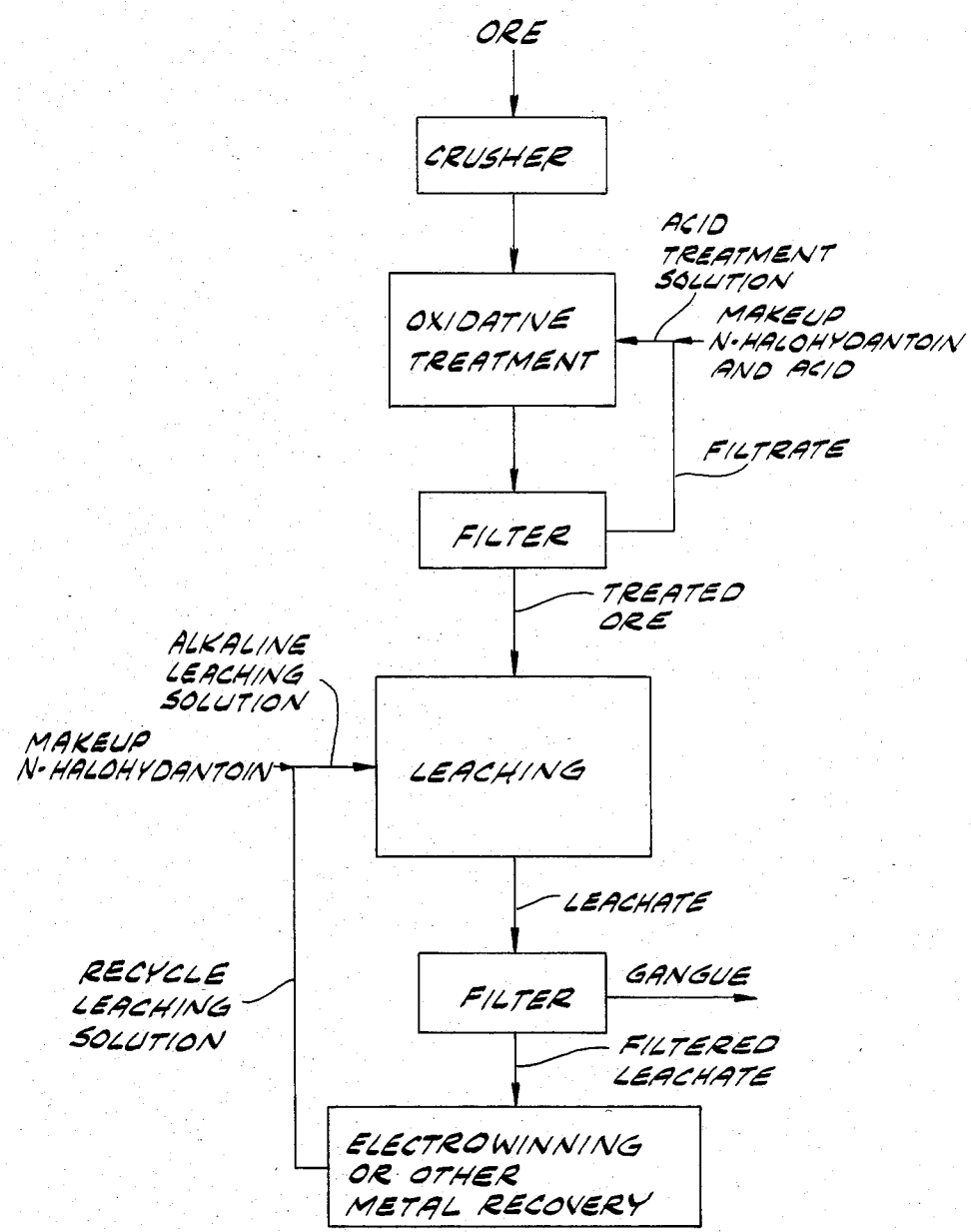

PROCESS FOR METAL RECOVERY AND COMPOSITIONS USEFUL THEREIN

BACKGROUND OF THE INVENTION

This invention relates to the field of extractive metallurgy, and more particularly to an improved hydyrometallurgical process for recovery of precious metals and base metals from ores and other sources.

Conventionally, precious metals such as gold and silver are recovered from ores by leaching with alkaline cyanide solution. By reaction with cyanide ion and oxygen, the precious metal is converted to a cyanide complex (gold cyanide anion) which is taken up in the leaching solution. The precious metal is recovered from the cyanide leachate by any of a number methods, including precipitation with a less noble metal such as zinc, direct electrowinning, ion exchange, carbon adsorption.

While widely practiced on a commercial scale, cyanide leaching suffers from well known disadvantages. Leaching rates with alkaline cyanide solutions are quite slow, contact times in the range of ten to fifteen hours being common in the case of gold ores. Because of the toxicity of cyanide, care must be exercised to maintain cyanide solutions on the alkaline side in order to prevent the release of hydrogen cyanide gas. Severe environmental restrictions must be observed, requiring careful monitoring and control of all process purge streams. Spent cyanide leaching solutions must be subjected to waste treatment operations before discharge to the environment.

In refractory ores, precious metals are contained in a quartz matrix which is difficult to break down for removal of the metal. In many of the other ores which remain available, the precious metal is bound to sulfide minerals and carbonaceous materials, which interfere with leaching by alkaline cyanide or other leaching solutions. Commonly, gold is found locked into refractory minerals such as pyrite or arsenopyrite. Processes have been proposed for oxidation of the latter types of ore prior to recovery of metal therefrom. Environmental restrictions make the use of roasting processes unattractive for this purpose, so that some ore processors have resorted to schemes such as pressure oxidation, in which the ore is contacted with oxygen and sulfuric acid at 160° to 180° C. for 1.5 to 2 hours. In addition to pyrite or arsenopyrite, ores to which pressure oxidation is applicable include stibnite, realgar, orpiment, and berthierite. Details on pressure oxidation and the chemistry of such processes are described by Berezowsky et al., "Pressure Oxidation Pretreatment of Refractory Gold," Minerals and Metallurgical Processing, May, 1984, pp. 1–4. In other processes, chlorine has been used for oxidation of sulfide-containing ores. Biochemical processes have also been developed in which bacteria promote the oxidation of the ore. See *Chemical Engineering*, June 10, 1985.

Carbonaceous ores typically contain graphitic or activated carbon, and long chain organic compounds similar to humic acids. Adsorption of gold or gold cyanide complexes onto the carbonaceous material interferes with the recovery of gold from carbonaceous ores. Consequently, pressure oxidation techniques have been used to eliminate carbon, typically by oxidation to CO of $CO_2$, and thereby provide better yields in the extraction of gold from the ore in the form of gold cyanide complex.

A variety of waste treatment processes have been developed for spent cyanide solutions used in the leaching of gold and other precious metals. Some metal processors have employed biochemical treatment using bacteria which are capable of degrading cyanide in mine effluents. Others have developed processes for converting cyanide to relatively nontoxic cyanate. One process uses sulfur dioxide in the presence of a copper catalyst, while various others utilize alkaline chlorination for conversion of cyanide to cyanate. Still another waste treatment process involves contact of the waste solution with hydrogen peroxide. Another method for treatment of cyanide bearing industrial waste effluent involves contact with ozone. See Bremen et al, "oxidation of Cyanide in Industrial Waste-Waters," *Enviromental Progress*, Vol. 4, No. 1 (February, 1985).

Because of the difficulties in extracting precious metals, especially gold, from refractory and carbonaceous ores, efforts have been devoted to the discovery of improved systems for the leaching of such metals. One process long known to the art is leaching with a bromocyanide solution, which is typically prepared by mixing sulfuric acid, potassium cyanide, potassium bromide, and potassium bromate. This process eliminates the need for oxygen cyanidation. However, while fresh bromocyanide solution may be effective for the treatment of refractory and other ores, bromocyanogen is rapidly decomposed by alkali, so that free alkali must be essentially absent during treatment of the ore. See Hamilton, *Manual of Cyanidation*, McGraw-Hill, New York (1920). Because of this, and further in view of the fact that potassium bromide is a product of the leaching reaction, the safety and environmental problems associated with cyanide solutions are aggravated by the use of bromocyanide.

More recently, processes have been proposed which use precious metal solubilizers other than cyanide. Thus, for example, thiourea has been proposed as an agent which effects leaching of gold at a rate substantially faster than that obtainable with cyanide. Leaching with thiourea is believed to produce a cationic rather than anionic gold cyanide complex. Because acid systems must be used for thiourea leaching, this process may involve increased equipment costs, at least in some instances. In still other processes, potassium iodide or ammonium polysulfide is used as a lixiviant in place of cyanide.

To accelerate cyanidation, proposals have been made for immersion of a sonic resonance rod in the leaching system, thereby enhancing the rate of diffusion of the leaching solution into the solid ore particles containing the precious metal. Various alternatives to cyanide leaching, certain of the newly developed techniques for enhancing cyanidation, and various of the methods for treating cyanide waste solutions are generally discussed in the aforesaid *Chemical Engineering* article.

In addition to ores, there is a substantial number of additional sources of precious and other metals which offer the opportunity for economical recovery. In fact, many of these secondary sources are substantially richer than the ores with respect to the content of the metal to be recovered. Gold is available from numerous scrap sources, including wastes from industrial uses, gold plated electronic circuit boards, and as an alloy with copper, zinc, silver, or tin in the karat gold used in jewelry. Silver is available from photographic and X-ray film emulsions, from scrap sterling, and from numerous industrial sources. Platinum, palladium and other platinum metals are available from spent catalysts, as well as other industrial and jewelry scrap sources. There is a substantial need for improved processes for recovery of precious and other metals from all sources, both primary and secondary.

As disclosed in Paterson U.S. Pat. No. 3,412,021, 1-bromo-3-chloro-5,5-dimethylhydantoin is known as an oxidizing biocide for use in water treatment. Patent and other technical literature discloses a number of uses for this and other N-halohydantoin compounds, primarily based on the biocidal properties of these compounds.

SUMMARY OF THE INVENTION

Among the several objects of the present invention, therefore, may be noted the provision of an improved process for the hydrometallurgical recovery of gold and other precious metals from ores; the provision of such a process which is effective for the recovery of such metals from refractory ores; the provision of such a process which is effective for recovery of metal from ores contaminated with sulfides and carbonaceous materials; the provision of such a process which is also effective for the secondary recovery of metals; the provision of such a process which can be implemented without incurring the safety and environmental risks associated with cyanide leaching; the provision of such a process which affords substantially enhanced rates of leaching as compared to cyanidation; the provision of such a process which produces leachates from which the leached metal can be effectively and economically recovered; the provision of such a process which includes the recovery of metal from the leachate; and the provision of compositions effective for the leaching of the aforesaid metals from ores and other source materials.

Still further objects of the invention include the provision of a novel method for recovery of precious and other metals by electrowinning, and the provision of novel electrolytic solutions useful in such electrowinning processes.

Briefly, therefore, the present invention is directed to a process for extracting a precious metal or base metal from a source material containing the metal. The process comprises contact of the source material with an aqueous leaching solution containing a leaching agent comprising an N-halohydantoin compound, thereby producing an aqueous leachate containing the metal.

The invention is further directed to a composition useful for leaching of a precious metal or base metal from a source material containing the metal. The composition comprises an aqueous solution containing a leaching agent comprising an N-halohydantoin and either an acid or a base. Where the composition is acidic, it has a pH of between about 1 and about 5 and comprises an acid selected from among hydrochloric acid, hydrobromic acid, hydroiodic acid, nitric acid, sulfuric acid, and acetic acid. Where the composition is basic, it has a pH of between about 7.5 and about 9.5 and comprises a base selected from the group consisting of potassium hydroxide, sodium hydroxide, calcium hydroxide, and barium hydroxide.

The invention is further directed to a composition which is subject to electrolysis for the electrodeposition of a metal. The composition comprises an N-halohydantoin compound and anions comprising the metal complexed with halogens derived from reaction of the N-halohydantoin compound with the metal.

Further contemplated by the invention is a process for recovery of a precious metal or base metal in metallic form, the process comprising direct current electrolysis of an electrowinning solution containing an N-halohydantoin compound and anions comprising a metal complexed with halogens derived from the reaction of the N-halohydantoin compound with the metal.

Further included in the invention is a process for electrodeposition of a precious metal or base metal. The process comprises direct current electrolysis of an electrolytic solution containing an N-halohydantoin compound and anions comprising the metal complexed with halogens.

Other objects and features will be in part apparent and in part pointed out hereinafter.

BRIEF DESCRIPTION OF THE DRAWING

The single figure of the drawing depicts a block flow diagram for a process of the invention which is effective for recovery of gold from an ore contaminated with sulfides and/or carbonaceous material.

DESCRIPTION OF THE PREFERRED EMBODIMENTS

In accordance with the present invention, it has been discovered that various N-halohydantoin compounds, including 1,3-dibromo-5,5-dimethylhydantoin, 1-bromo-3-chloro-5,5-dimethylhydantoin, and 1,3-dichloro-5,5-dimethylhydantoin, comprise highly effective leaching agents for gold and other precious metals. Aqueous solutions of such N-halohydantoin compounds have been found to attack ores and other source materials so as to rapidly, and essentially quantitatively, dissolve precious metals contained therein. Thus, a highly efficient and economical method is provided for recovery of precious metals from ores.

Because the metal leaching processes of the invention may be carried out without the use of any cyanide, it offers significant advantages from the standpoint of both safety and environmental protection. This translates into major cost advantages, since elaborate cyanide disposal facilities and procedures may be entirely eliminated.

Moreover, it has been discovered that N,N'-dihalohydantoins attack precious metal source materials to extract the metal therefrom at rates which may be substantially enhanced by comparison with those achieved in cyanide extraction processes. Thus, for example, within a period of 2 to 4 hours, contact with a solution of 1,3-dibromo-5,5-dimethylhydantoin or 1-bromo-3-chloro-5,5-dimethylhydantoin may typically provide quantitative leaching of ores which require ten to fifteen hours for leaching with cyanide solutions.

It has further been found that the leaching process of the invention is effective for recovery of precious metals from refractory ores and ores containing sulfide minerals and carbonaceous material. In most instances, the process provides enhanced rates of leaching as compared to cyanidation. While oxidative treatment of sulfide-containing or carbonaceous ores generally remains necessary, the oxidizing power of the leaching agent is such that it may used for this purpose as well. Generally, an acidic solution of the leaching agent is used for oxidative pre-leaching, while either an acidic or basic solution of the leaching agent is used for recovery of the metal from the ore after oxidation and removal of sulfides and excess carbonaceous material.

The process of the invention is effective for recovery of metal values from gold ores, silver ores and other precious metal ores. Moreover, leaching with N-halohydantoin compounds is also effective and advantageous for secondary recovery of precious metals from other source materials such as jewelry scraps, silver halide film emulsions, spent colloidal gold suspensions, gold plating from electronic circuit boards, spent platinum metal catalysts and the like. Further in accordance with the invention, N-halohydantoin compounds may be utilized for leaching of the various base metals, particularly those which form halide complex anions such as aluminum, magnesium, chromium, iron, cobalt, nickel, copper, tin, bismuth, antimony, cadmium, lead, zinc, indium, gallium and arsenic.

Preferably, the leaching agent is an N,N'-dihalohydantoin compound, more preferably a 1,3-dihalohydantoin corresponding to the formula:

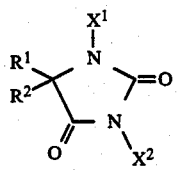

where $R^1$ and $R^2$ are independently selected from among hydrogen and alkyl, and $X^1$ and $X^2$ are independently selected from among chlorine, bromine, and iodine. Where $R^1$ and/or $R^2$ are alkyl, they may for example, comprise methyl, ethyl, n-propyl, isopropyl, n-butyl, or n-pentyl. Generally, it is preferred that the constituents comprising $R^1$ and/or $R^2$ contain not more than about 5 carbon atoms. Particularly preferred leaching agents include 1,3-dibromo-5,5-dimethylhydantoin, 1-bromo-3-chloro-5,5-dimethylhydantoin, and 1,3-dichloro-5,5-dimethylhydantoin.

Although we do not wish to be bound to a particular theory, it is believed that the N-halohydantoin compound reacts with the metal in the source material to produce an anion comprising the metal complexed with halogen, and that this complex anion is taken up into the leaching solution. Apparently N-halohydantoin compounds, especially the N,N'-dihalohydantoin compounds described above, are such strong oxidizing agents that they are capable of readily producing halogenated metal complex anions, even of precious metals that are present in very low concentrations in low grade ores. Whatever the mechanism, the process of the invention provides a most effective and advantageous method for precious metal recovery.

Leaching solutions to be used for recovery of precious metals from low grade ores should contain at least about 0.05%, preferably at least about 0.1%, by weight of the leaching agent. Where the leaching solution is to be used for secondary recovery of metal from such relatively high grade sources as jewelry scraps, karat gold, waste colloidal gold suspensions, and spent platinum metal catalysts, a stronger leaching solution is preferably used, for example, one containing between about 2 and about 10 pounds of leaching agent per ton of solution, i.e., between about 1 and about 5 gpl. For purposes of this disclosure, a high grade source is one in which the metal to be recovered is present in a weight proportion of greater than 1%, and the metal to be extracted is accessible to the leaching solution without the necessity of chemically degrading non-metallic contaminants. For most applications, it is preferred that the leaching solution be alkaline, having a pH of between about 7.5 and about 9.5. The base component of an alkaline leaching solution is preferably sodium hydroxide, potassium hydroxide, calcium hydroxide or barium hydroxide.

For pre-leaching and oxidative treatment of carbonaceous ores, it is preferred that the treating solution be acidic. As in the case of alkaline leaching solutions, the acidic solution should contain at least about 0.05%, preferably at least about 0.1% by weight of the leaching agent. The pH is preferably in the range of between about 1 and about 5. Acids which may be used in the acidic leaching solution include hydrochloric acid, hydrobromic acid, hydroiodic acid, nitric acid, sulfuric acid and acetic acid.

The metal source material may be contacted with the leaching solution in any conventional fashion, for example, by heap leaching, in which the leaching solution is percolated through a mass of ore or other sources material. For heap leaching the ore is initially crushed, typically to a particle size of less that 25 mm, and the particulate mass is placed on impermeable pads prin to perculation of the leaching solution therethrough.

Alternatively, the ore may be subjected to vat leaching or agitation leaching. In vat leaching, the ore is crushed, again typically to a particle size of less than 25 mm, and agglomerated, for example, with lime or cement. Leaching solution is passed through a bed of particulate ore contained within a leaching vessel. Conveniently, the solution may be passed either upwardly or downwardly through the best of material; or the leaching solution and ore can be moved countercurrently through a continous or cascade leaching system.

In agitation leaching, the ore is typically ground to a finer particle size, for example, 50% by weight or greater minus 200 mesh. Thereafter, a leaching slurry is formed by suspending a source material in the leaching solution. Leaching rates are enhanced by subjecting the leaching slurry to agitation in a baffled tank to promote mass transfer from the solid source material to the leaching solution. However, while agitation is desirable, excessive shearing action is not. Preferably, therefore, a propeller type agitator is used.

Illustrated in FIG. 1 is a block flow diagram of a preferred process for the recovery of gold from a carbonaceous and/or sulfide-bearing ore. There the crushed ore is initially mixed with an acidic oxidative treatment solution comprising the N-halohydantoin compound to form a treatment slurry which is agitated in a stirred tank. Contact of the ore with the treatment solution effects oxidation and digestion of carbonaceous material, resulting in the destruction of the carbonaceous material or its dissolution or dispersion in the aqueous phase. The treatment slurry is then filtered to separate the ore from the treatment solution. The filtrate is recycled for use in treatment of additional quantities of raw ore, and the treated ore is mixed with an alkaline N-halohydantoin leaching solution to produce a leaching slurry. After agitation, the leaching slurry is filtered to remove the gangue, which is discarded, and the leachate is thereafter subjected to further processing, for example, electrowinning, for ultimate recovery of the gold. Where the gold is separated from the leachate by such methods as ion exchange, carbon adsorption or electrowinning, the spent solution may be replenished with leaching agent and recycled for further use in leaching gold from treated ore.

In leaching of ore, the ore is contacted with leaching solution in relative proportions equivalent to at least about 1.5, preferably at least about 2, pounds of N,N'-dihalohydantoin compound per ton of ore. For maximum productivity in slurry leaching, the solids content of the leaching slurry should not be greater than about 40% by weight. Leaching may be carried out at any temperature above ambient, but is preferably conducted at a temperature of between about 90° and about 140° F., i.e., between about 30° and about 60° C. At temperatures in the aforesaid range, leaching proceeds very rapidly. In slurry leaching, complete and quantitative recovery of precious metal from ore may be accomplished within a contact time of one to two hours, or even less.

For oxidative pre-leaching of carbonaceous or sulfide bearing ore, the conditions employed are generally comparable to those used for leaching. For treatment of high grade ores, or in the case of secondary recovery, the pre-leaching oxidative treatment step is not normally necessary.

To recover the metal from the leachate, various techniques may be utilized. In some instances, particularly in the case of secondary recovery from a metal-rich source material, the leachate may be subjected directly to electrowinning or precipitation. In electrowinning, the metal to be recovered is preferably recovered on a cathode of the same metal. Alternatively, an inert cathode may be used. Conventional inert anode materials, current densities, temperatures and other conditions conventionally appropriate for the particular metal to be recovered are utilized in the electrowinning process. In one advantageous application, the electrolytic system comprises a steel wool cathode and an ion exchange membrane for dividing the anodic and cathodic zones.

Where the leachate contains a precious metal, it is often feasible to recover it by contacting the leachate with a metal less noble than the leached metal, thereby precipitating the leached metal in metallic form. In the case of gold, precipitation may be carried out by methods known to the art, for example, in a Merrill-Crowe apparatus using zinc as the precipitating agent. In a preferred commercial technique, the leachate is contacted with zinc shavings or zinc powder in the presence of lead acetate, the lead acetate typically being provided as a coating on the surface of the zinc. In a still further alternative recovery method, the leachate may be contacted with an ion exchange resin effective for separating anionic precious metal complexes from aqueous solutions. Typical of these are the 3200 to 4200 series of resins selective for silver and gold as sold by Rohm & Haas. The metal may then be recovered from the resin pyrolytically.

Where the leachate is derived from ore, particularly where it is obtained by leaching of refractory or other low grade ore, it is normally desirable to concentrate the metal before attempting to recover it in metallic form. A preferred method for concentrating the metal is by adsorption of halometal complex salts from the leachate onto activated carbon, followed by redissolution in a desorptive leaching solution. In accordance with the process of the invention, the desorbing agent contained in the desorption solution may comprise an N-halohydantoin or cyanide, and the metal may ultimately be recovered from the desorbate by precipitation or electrowinning. Conventional cyanide desorption solutions comprise alkaline mixtures of alcohol, typically ethanol and water. Where the metal is redissolved in an N-halohydantoin solution, the concentrated desorption solution is preferably substantially saturated with respect to N-halohydantoin, and the desorbate contains 5 to 30 gpl of the desorbed metal. It is also preferred that the desorption solution be either alkaline in a pH range of about 7.5 to about 9.5, or acid in a pH range of between about 1 and about 5. Desorptive leaching of the metal from the activated carbon is preferably carried out at a temperature of between about 90° and about 140° F. (30° to 60° C.).

Electrowinning of a precious metal or base metal from an N-halohydantoin solution comprises a novel method for recovery of such metals. Generally, the electrolytic solution used for electrowinning contains between about 5 and about 30 gpl, preferably at least about 15 gpl, of the desired metal in the form of halometal complex anions, and is substantially saturated with respect to N-halohydantoin. When the electrowinning solution is acidic, it preferably has a pH of between about 4 and about 6. Where it is alkaline, it preferably has a pH of between about 7.5 and about 9. Application of a direct current through the solution breaks down the metal halide complex anions at the anode, resulting in the formation of free metal ions which are attracted to the cathode where they are reduced and the metal is deposited. The selection of anode and cathode materials, current density, electrode spacing, temperature and other conditions is governed by conventional practice for electrowinning of the particular metal involved. Thus, for example, in the case of gold electrowinning is preferably carried out at a temperature of not greater than about 140° F. (52° C.), a current density of approximately 0.25 amps./ft$^2$, a voltage of 1.9 to 2.1 volts, and an electrode spacing of not greater than about 2". As noted above, after electrowinning is complete, the spent electrolytic solution may be replenished with leaching agent, pH-adjusted as necessary, and recycled for leaching of additional source material.

Further in accordance with the invention, electrolytic solutions of the type described above in connection with electrowinning can be used for other electrodeposition processes, including electrorefining and electroplating. In electrorefining, the anode comprises the metal to be purified, and the electrolytic solution contains N-halohydantoin and halogen complex anions of the metal which is to be deposited at the cathode as direct current is applied. In some instances, the metal to be refined is deposited at the cathode, while in other instances an impurity is deposited at the cathode while the metal to be refined is collected in the form of a sludge or mud as the anode disintegrates. For example, gold contaminated with silver may be refined by subjecting an anode of such material to electrolysis in a bath comprising N-halohydantoin and halogenated silver complex anions. Silver is deposited at the cathode and as the anode disintegrates a mud rich in gold is collected by conventional means, for example, in a filter bag surrounding the anode. The mud is washed and the gold contained therein is melted down, formed into another anode, and subjected to further electrofining, this time in a bath comprising N-halohydantoin and halogenated gold complex anions, with metallic gold being deposited at the cathode.

In electroplating, a part to be plated is immersed in a bath comprising an N-halohydantoin and halogen complex anions of the metal to be deposited. The anode may be either inert or comprise the plating metal. In electrofining and electroplating, as in electrowinning, the temperatures, current densities, voltages, electrode spacings, etc., are those conventionally used in the art.

The following examples illustrate the invention.

EXAMPLE 1

An aqueous preleaching oxidative treatment solution was prepared containing 1,3-dibromo-5,5-dimethylhydantoin (0.1% by weight) and hydrochloric acid sufficient to adjust the pH to about 1. This treatment solution was mixed with a low grade gold ore to produce a treatment slurry. The ore treated comprised 22% Si, 13% Al, 5% Na, 3% K, 2% Fe, 2% Ca, 0.5% Mg, 0.5% Ti, 0.1% Ba, 0.003% B, 0.006% Ga, 0.05% Mn, 0.0006% V, 0.0009% Cu, 0.001% Ag, 0.001% Ni, 0.002% Co, 0.05% Sr, 0.02% Zr, 0.003% Cr, and 0.02 to 0.25 oz. Au per ton. The leaching solution and ore were mixed in such proportions as to produce a treatment slurry having an ore density (i.e. having a proportion by weight solids) of approximately 40%. This slurry contained about 2 pounds of 1,3-dibromo-5,5-dimethylhydantoin per ton of raw ore. The treatment slurry was agitated in a stirred tank with a propeller agitator driven at 120 rpm for a period of 2.5 hours and a temperature of about 52° C. Treatment in this manner caused digestion of carbonaceous matter associated with the raw ore. Thereafter, the treatment slurry was filtered to recover the treated ore.

EXAMPLE 2

An aqueous leaching solution was prepared containing 1,3-dibromo-5,5-dimethylhydantoin (0.1% by weight) and sodium hydroxide sufficient to adjust the pH to about 9. This leaching solution was mixed with an ore of the type described in Example 1, and which had been treated in the manner described in Example 1. The relative proportions of leaching solution and treated ore were such that the resulting leaching slurry had an ore density of about 40% and contained about 2 pounds of 1,3-dibromo-5,5-dimethylhydantoin per ton of treated ore. The leaching slurry was agitated in a stirred tank with a propeller agitator driven at a speed of 120 rpm for a period of 2.5 hours and a temperature of about 52° C. After leaching was complete, the leaching slurry was filtered and the tailings discarded. Substantially all of the gold contained in the raw ore was recovered in the leachate.

EXAMPLE 3

A series of runs was made in which varying conditions were used for the leaching of an ore of the type described in Example 1, and which had been treated in the manner described in Example 1. The leaching runs were carried out in a manner generally similar to that described in Example 2, except that the leaching solutions were either neutral or acidic, the concentration of leaching agent in the leaching solution was varied, the concentration of acid (hydrochloric) in the acidic leaching solutions was varied, the temperature was varied between 140° F. and ambient, and the agitator was in one instance shut off. The results of the runs of this example are set forth in Table 1.

| Sample # | H$_2$O | 55-A | Temp | Leach Time | pH | Ore Wt. | HCl | Au | $^{Oz}$Ag | Agitation | Remarks |
|---|---|---|---|---|---|---|---|---|---|---|---|
| 1 | 2 KmL | 5 Gr | 140 F. | 2.5 Hrs | 9 | 3 AT* | no | 3.4 | 8 | 120 RPM | Clear Filtrat |
| 2 | " | " | " | " | 1 | " | yes 2 cc | 9.1 | 14 | " | Dark Brown Filtrate |
| 3 | 300 mL | 3 Gr | Abt | 3.5 Hrs | 1 | 1-AT* | 4 mL | 10.2 | 1.5 | No | Yellow |
| 4 | " | " | " | " | " | " | " | 34.0 | 31.8 | " | " |
| 5 | 100 mL | " | " | " | " | " | " | 0.25 | 0.34 | " | " |
| 6 | " | " | " | " | " | " | " | 0 | 0.02 | " | " |
| 7 | 700 mL | " | " | " | 0 | " | " | 0.06 | 0 | " | " |
| 8 | " | 4.2 Gr | " | " | 0 | " | " | 1.4 | 0.06 | " | " |
| 9 | " | 3 Gr | " | " | 0 | " | " | 0.19 | 0.02 | " | " |
| 10 | " | " | " | " | 1 | " | " | 5.6 | 0.06 | " | " |
| 11 | 300 mL | 3 Gr | 68 C. | 3 Hrs | 0 | " | 3 mL | 0.82 | 0.20 | Yes | " |
| 12 | " | " | " | " | " | " | " | 0.82 | 0.20 | " | " |

*Assay Ton
Recovery rates are approximately 78% of head assay.

EXAMPLE 4

A synthetic ore was prepared by mixing barren sodium potassium calcium aluminum silicate ore with an aqua regia solution containing gold ions in relative proportions of 1 mg gold ions per assay ton of the barren ore. Sodium metabisulfite was added to the mixture to precipitate the gold in metallic form, and facilitate complete uniformity in mixing of zero valence gold throughout the barren ore material. After precipitation of gold, the mixture was evaporated to dryness, rinsed to remove chloride and nitric acid residues, and again dried. The synthetic ore thus produced was highly uniform and homogeneous, with a precisely established gold content.

A leaching solution was produced by dissolving 1,3-dibromo-5,5-dimethylhydantoin in water (30 ml) to produce a solution that was substantially saturated. The pH of the solution was adjusted to 8 by addition of sodium hydroxide. The leaching solution was mixed with a specimen (⅓ assay ton) of synthetic gold ore produced in the manner described above, and the resultant leaching slurry was heated to approximately 145° F. and stirred for about 30 minutes. Thereafter, the leachate was decanted off and filtered, diluted to a standard 100 ml, and analyzed on an AA spectrophotometer with an Au 10 ppm standard as a reference. Aspiration of the leachate into the AA flame with appropriate background correction produced a reading of 33 on a full scale calibration of 100. This corresponds to a concentration of 0.33 mg of gold per 100 ml, or precisely 100% of the gold content of the one-third assay ton sample used.

EXAMPLE 5

Synthetic gold ore (⅓ assay ton) containing one mg of gold per assay ton was prepared in the manner described in Example 4. A leaching solution was prepared by dissolving 1,3-dibromo-5,5-dimethylhydantoin in water to the point of saturation and adjusting the pH of the solution to 1 by addition of HCl. A leaching slurry was prepared by mixing a leaching solution and the synthetic gold ore, and the slurry was heated to 145° F. and stirred for 30 minutes. AA analysis of the leachate showed that only about one-half of the 0.33 mg gold was taken up into the leaching solution. Continued leaching failed to extract additional gold, but the addition of 35% hydrogen peroxide (2 ml) to the leaching solution resulted in extraction of the balance of the gold. From the results of this example, it was determined that the oxidizing capability of 1,3-dibromo-5,5-dimethylhydantoin declines rapidly at low pH values of 1.0 or less.

EXAMPLE 6

Using the method described in Example 4, a synthetic gold ore (⅛ assay ton) was prepared containing one mg gold per assay ton. A leaching solution was prepared in the manner described in Example 5, except that the pH was adjusted to 3 with 35% HCl. A leaching slurry was prepared by mixing the synthetic gold ore and the leaching solution, and the slurry was heated to 145° F. and stirred. Full extraction of the 0.33 ml gold was achieved after one hour of leaching.

EXAMPLE 7

A leaching solution was prepared in the manner described in Example 4 and used for leaching of the gold plating from electronic circuit boards and drillings from gold jewelry alloys. In leaching of 12 karat to 14 karat gold/silver alloys, the progress of leaching was retarded by the formation of an insoluble layer of silver chloride or silver oxide, which passivated the underlying alloy and stopped the leaching reaction.

While the process of the invention is effective for the extraction of both gold and silver from sources containing gold substantially free of silver, or silver substantially free of gold, preliminary processing may be necessary where the source contains comparable amounts of gold and silver. For example, sources containing significant proportions of silver may be treated with nitric acid to leach out the silver, and the solid residue then treated in accordance with the process of the invention for extraction of gold.

In view of the above, it will be seen that the several objects of the invention are achieved and other advantageous results attained.

As various changes could be made in the above methods and products without departinbg from the scope of the invention, it is intended that all matter contained in the above description shall be interpreted as illustrative and not in a limiting sense.

What is claimed is:

1. A process for extracting a precious metal or base metal from a source material containing said metal, the process comprising contacting said source material with an aqueous leaching solution containing a leaching agent comprising an N-halohydantoin compound, thereby producing an aqueous leachate containing said metal.

2. A process as set forth in claim 1 wherein said leaching agent comprises an N,N'-dihalohydantoin compound.

3. A process as set forth in claim 2 wherein said leaching agent comprises a compound corresponding to the formula:

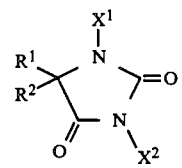

where $R^1$ and $R^2$ are independently selected from the grou consisting of hydrogen and alkyl, and $X^1$ and $X^2$ are independently selected from the group consisting of chlorine, bromine and iodine.

4. A process as set forth in claim 3 wherein said leaching agent is selected from the group consisting of 1-bromo-3-chloro-5,5-dimethylhydantoin 1,3-dichloro-5,5-dimethylhydantoin, and 1,3-dibromo-5,5-dimethylhydantoin.

5. A process as set forth in claim 4 wherein said metal comprises a precious metal selected from the group consisting of gold and silver.

6. A process as set forth in claim 5 wherein said metal comprises gold.

7. A process as set forth in claim 2 wherein said leaching solution further comprises an acid and has a pH of between about 1 and about 5.

8. A process as set forth in claim 7 wherein said acid is selected from the group consisting of hydrochloric acid, hydrobromine acid, hydrofluorine acid, hydroiodic acid, sulfuric acid, nitric acid and acetic acid.

9. A process as set forth in claim 8 wherein said source material comprises a precious metal ore and said leaching solution contains at least about 0.05% by weight of said leaching agent.

10. A process as set forth in claim 8 wherein said source material comprises a high grade source comprising precious metal, and said leaching solution contains between about 2 and about 10 lbs. of said leaching agent per ton of said solution.

11. A process as set forth in claim 7 wherein the temperature of the leaching solution is maintained at between ambient and about 140° F. during leaching.

12. A process as set forth in claim 2 wherein said leaching agent further comprises a base and has a pH of between about 7.5 and about 9.5.

13. A process as set forth in claim 12 wherein said base is selected from the group consisting of sodium hydroxide, potassium hydroxide, barium hydroxide and calcium hydroxide.

14. A process as set forth in claim 13 wherein said source material comprises a precious metal ore and said leaching solution contains at least about 0.05% by weight of said leaching agent.

15. A process as set forth in claim 13 wherein said source material comprises a high grade source comprising precious metal and said leaching solution contains between about 2 and about 10 lbs. of said leaching agent per ton of said solution.

16. A process as set forth in claim 12 wherein the temperature of said leaching solution is maintained between ambient and about 140° F. during leaching.

17. A process as set forth in claim 16 wherein said leaching solution is maintained at at least about 90° F. during leaching.

18. A process as set forth in claim 2 wherein a particulate precious metal ore is mixed with said leaching solution to provide a leaching slurry, said slurry being agitated to promote leaching.

19. A process as set forth in claim 2 wherein said leaching solution is percolated through a porous mass of precious metal ore.

20. A process as set forth in claim 2 wherein the leached metal is recovered from said leachate by contacting the leachate with a metal less noble than the leached metal, said leached metal being thereby precipitated in metallic form.

21. A process as set forth in claim 20 wherein said leached metal comprises gold, and said leachate is contacted with particulate zinc in the presence of lead acetate for precipitation of gold from the leachate.

22. A process as set forth in claim 2 further comprising the steps of:
contacting said leachate with an anion ion exchange resin, thereby transferring the leached metal from the leachate to the ion exchange resin; and
recovering the leached metal from the ion exchange resin.

23. A process as set forth in claim 2 further comprising the steps of:
contacting the leachate with activated carbon, thereby adsorbing said leached metal onto said activated carbon;
removing said leached metal from said activated carbon by contacting the activated carbon with a desorbing solution comprising a leaching agent selected from the group consisting of cyanide ion and an N-halohydantoin compound, thereby producing a desorbate having a concentration of said leached metal therein which is higher than the concentration of said leached metal in the first leachate; and
recovering said leached metal from said desorbate.

24. A process as set forth in claim 23 wherein said leached metal is recovered from said desorbate by electrowinning.

25. A process as set forth in claim 2 wherein said source material comprises a precious metal ore contaminated with carbonaceous material, the process comprising:
initially contacting said source material with an acidic aqueous treating solution for digestion of said carbonaceous material, thereby destroying the carbonaceous material or dissolving or dispersing the carbonaceous material in the aqueous phase;
separating said aqueous phase from said source material; and
thereafter contacting said source material with said aqueous leaching solution to produce said leachate.

26. A process as set forth in claim 25 wherein said aqueous treating solution comprises a solution containing an N,N'-dihalohydantoin and an acid, said treating solution having a pH of between about 1 and about 5, said leaching solution comprising an aqueous solution comprising an N,N'-dihalohydantoin and an inorganic base, said leaching solution having a pH of between about 7.5 and about 9.5.

27. A process as set forth in claim 26 wherein a treating slurry is formed comprising said source material suspended in said treating solution, the source material is separated from said treating slurry by filtration or centrifugation, the solids thereby recovered are suspended in said leaching solution to form a leaching slurry, the leaching slurry is agitated to promote transfer of said metal from said source to said leaching solution, and the gangue remaining after leaching is separated from the leachate by filtration or centrifugation.

28. A process as set forth in claim 27 wherein after solids separation the treating solution is recycled for further use in treating source material contaminated with carbonaceous material.

29. A process as set forth in claim 28 wherein the leached metal is recovered from the leachate by electrowinning, ion exchange, precitation or carbon adsorption.

30. A process as set forth in claim 29 wherein after recovery of said leached metal therefrom said leaching solution is replenished with N,N'-dihalohydantoin and recycled for further use in leaching said metal from treated source material.

31. A composition useful in the leaching of a precious or base metal from a source material containing such metal, the composition comprising an aqueous solution containing an acid and a leaching agent comprising an N-halohydantoin, said acid being selected from the group consisting of hydrochloric acid, hydrobromic acid, hydrofluoric acid, hydroiodic acid, nitric acid, sulfuric acid, and acetic acid, the pH of said solution being between about 1 and about 5.

32. A composition as set forth in claim 31 and adapted for use in recovery of metals from ores, said composition containing at least about 0.05% by weight of said N-halohydantion compound.

33. A composition as set forth in claim 32 wherein said leaching agent comprises an N,N'-dihalohydantoin compound.

34. A composition as set forth in claim 33 wherein said N,N'-dihalohydantoin compound corresponds to the structural formula:

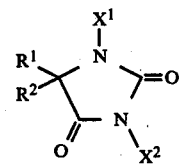

where $R^1$ and $R^2$ are independently selected from the group consisting of hydrogen and alkyl, and $X^1$ and $X^2$ are independently selected from the group consisting of chlorine, bromine and iodine.

35. A composition as set forth in claim 34 wherein said N,N'-halohydantoin compound is selected from the group consisting of 1-bromo-3-chloro-5,5-dimethylhydantoin, 1,3-dibromo-5,5-dimethylhydantoin, and 1,3-dichloro-5,5-dimethylhydantoin.

36. A composition as set forth in claim 31 and adapted for use in secondary recovery of metal, said solution containing between about 2 and about 10 pounds of said leaching agent per ton of solution.

37. A composition useful in leaching of a precious or base metal from a source of material containing such metal, said composition comprising an aqueous solution containing a base and a leaching agent comprising an N-halohydantoin, said base being selected from the group consisting of potassium hydroxide, sodium hydroxide, calcium hydroxide, and barium hydroxhide, the pH of said solution being between about 7.5 and about 9.5.

38. A composition as set forth in claim 37 adapted for use in recovering metals from ores, said composition containing at least 0.05% by weight of said N-halohydantoin compound.

39. A composition as set forth in claim 38 wherein such leaching agent comprises an N,N'-dihalohydantoin compound.

40. A composition as set forth in claim 39 wherein said N,N'-dihalohydantoin compound corresponds to the formula:

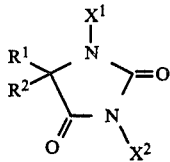

where $R^1$ and $R^2$ are independently selected from the group consisting of hydrogen and alkyl and $X^1$ and $X^2$ are independently selected from the group consisting of chlorine, bromine, and iodine.

41. A composition as set forth in claim 40 wherein said N,N'-dihalohydantoin compound is selected from the group consisting of 1-bromo-3-chloro-5,5-dimethylhydantoin 1,3 dibromo-5,5dimethylhydantoin and 1,3-dichloro-5,5 dimethylhydantoin.

42. A composition as set forth in claim 37 and adapted for use in secondary recovery of metal, said solution containing between 2 and about 10 pounds of said leaching agent for ton of solution.

43. A composition which is subject to electrolysis for the electrodeposition of a metal, said composition comprising an N-halohydantoin compound and an anion comprising said metal complexed with halogens derived from reaction of the halohydantalyn compound with a source of the metal.

44. A composition as set forth in claim 43 wherein the N-halohydantoin compound comprises an N,N'-dihalohydantoin.

45. A composition as set forth in claim 44 wherein said N,N'-dihalohydantoin compound corresponds to the structual formula:

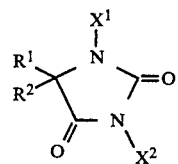

where $R^1$ and $R^2$ are selected from the group consisting of hydrogen and alkyl and $X^1$ and $X^2$ are independently selected from the group consisting of chlorine, bromine, and iodine.

46. A composition as set forth in claim 45 wherein said halohydantalyn compound is selected from group consisiting of 1-bromo-3-chloro-5,5-dimethylhydantoin, 1,3-dibromo-5,5-dymethlhydantoin, and 1,3-dichloro-5,5-dymethlhydantoin.

47. A process for recovery of a precious metal or base metal comprising direct current electrolysis of an electrowinning solution containing a halohydantoin compound and anions comprising said metal complexed with halogens derived from the reaction of said halohydantoin compound with said metal.

48. A process as set forth in claim 47 wherein said electrowinning solution further contains an acid and has a pH of between about 4 and about 6.

49. A process as set forth in claim 47 wherein said electrowinning solution further contains a base, and has a pH of between about 7.5 and about 9.

50. A process for electrodeposition of a precious metal or base metal comprising direct current electrolysis of an electrolytic solution containing an N-halohydantoin compound and anions comprising said metal complexed with halogens.

* * * * *

REEXAMINATION CERTIFICATE (1332nd)

United States Patent [19]

Sergent et al.

[11] B1 4,637,865

[45] Certificate Issued  Jul. 24, 1990

[54] PROCESS FOR METAL RECOVERY AND COMPOSITIONS USEFUL THEREIN

[75] Inventors: Rodney H. Sergent; Kenneth N. Thanstrom

[73] Assignee: Great Lakes Chemical Corp., West Lafayette, Ind.

Reexamination Request:
No. 90/001,891, Nov. 7, 1989

Reexamination Certificate for:
Patent No.: 4,637,865
Issued: Jan. 20, 1987
Appl. No.: 766,833
Filed: Aug. 16, 1985

[51] Int. Cl.$^5$ ............................................. C25C 1/20
[52] U.S. Cl. ............................... 204/111; 204/105 R; 204/109; 204/110; 204/114; 204/117; 204/118
[58] Field of Search ........... 204/109, 110, 111, 105 R; 423/23, 24, 27, 38, 39; 75/109; 210/660, 661, 666, 663, 669, 670, 679, 684, 694

[56] References Cited

U.S. PATENT DOCUMENTS

| | | | |
|---|---|---|---|
| 267,723 | 11/1882 | Schaeffer | 75/102 |
| 716,847 | 12/1902 | Martino | 423/29 |
| 732,709 | 7/1903 | Cassel | 423/38 |
| 2,283,198 | 5/1942 | Fink et al. | 75/102 |
| 3,397,040 | 8/1968 | Lakin et al. | 23/230 |
| 3,412,021 | 11/1968 | Paterson | 210/62 |
| 3,558,503 | 1/1971 | Goodenough et al. | 252/187 |
| 4,190,498 | 2/1980 | Bahl et al. | 156/664 |
| 4,382,799 | 5/1983 | Davis et al. | 8/107 |

FOREIGN PATENT DOCUMENTS

0011817  9/1886  United Kingdom .
2143513  of 1985  United Kingdom .

OTHER PUBLICATIONS

Engineering and Mining Journal, 1944 vol. 45, (No. 3), 70–73, (Putnam).
Nickles (1867), Ann. Ch. Phys., pp. 318, 383.
Godsall, L. D., (1894), Engineering and Mining Journal, Jan. 6, Jan. 13, pp. 5–7 and pp. 32–33.
Rose T. Kirke, (1894), The Metallurgy of Gold, Charles Griffin & Co., Ltd., London, pp. 16–29, 266–317.
Pauli, H. Gerg.—Und Heuttenmaennische Zeitung 56 (44), 379–380, (1897).
Dingler's Polytechnisches Journal, 1875, p. 253.
Schnabel, K., Handbook of Metallurgy, vol. I, Copper–Lead–Silver Gold, 2nd Edition, 1007–1009, (1905), MacMillan & Co., Ltd., London.
Haddon et al, Analyst, 105, 371–378, (1980).
Jolles, Z. E. Ed., Bromine and its Compounds, Academic Press, New York, 1966, pp. 344–345.
Olin, "New Look Water Book for Pool Professionals", (1981).
Quadratics Sales Pty. Ltd., "Advantages of Using Spa Bromin Hot Water Pools and Spas".
Quadratics Sales Pty. Ltd., "Getting into Hot Water with . . . Spa Brom the Space Age Way to Treat Your Spa Water".

Primary Examiner—John F. Niebling

[57] ABSTRACT

A process for extracting a precious metal or base metal from a source material containing the metal. The process comprises contacting the source material with an aqueous leaching solution containing a leaching agent comprising an N-halohydantoin compound, thereby producing an aqueous leachate containing said metal. Aqueous leaching compositions, and novel electrowinning and other electrodeposition processes are also disclosed.

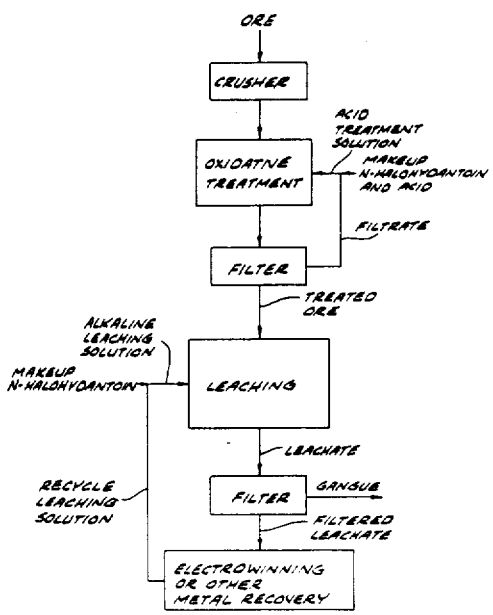

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-50 is confirmed.

* * * * *